US009673924B2

(12) United States Patent
Chun

(10) Patent No.: US 9,673,924 B2
(45) **Date of Patent: *Jun. 6, 2017**

(54) METHOD OF LINKAGE-VIEWING TV BROADCASTING PROGRAM BETWEEN MOBILE COMMUNICATION APPARATUS AND DIGITAL TV, AND MOBILE COMMUNICATION APPARATUS AND DIGITAL TV THEREOF

(71) Applicant: SAMSUNG ELECTRONICS CO., LTD., Suwon-si (KR)

(72) Inventor: Min-kyung Chun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,555

(22) Filed: Feb. 10, 2015

(65) Prior Publication Data

US 2015/0155959 A1 Jun. 4, 2015

Related U.S. Application Data

(63) Continuation of application No. 13/480,128, filed on May 24, 2012, now Pat. No. 8,976,295, which is a (Continued)

(30) Foreign Application Priority Data

Feb. 14, 2007 (KR) ........................ 10-2007-0015605

(51) Int. Cl.

| | |
|---|---|
| ***H04N 7/00*** | (2011.01) |
| ***H04H 40/18*** | (2008.01) |
| ***H04H 60/80*** | (2008.01) |

(52) U.S. Cl.

CPC ............ *H04H 40/18* (2013.01); *H04H 60/80* (2013.01)

(58) Field of Classification Search

CPC ........................................................ H04N 7/00

(Continued)

(56) References Cited

U.S. PATENT DOCUMENTS

| | | | |
|---|---|---|---|
| 6,781,635 B1 | 8/2004 | Takeda | |
| 7,376,441 B2 * | 5/2008 | Lee | H04M 1/72527 341/176 |

(Continued)

FOREIGN PATENT DOCUMENTS

| | | |
|---|---|---|
| CN | 1505375 A | 6/2004 |
| CN | 1612603 A | 5/2005 |

(Continued)

OTHER PUBLICATIONS

Communication issued on Feb. 28, 2015 by The State Intellectual Property Office of PR China in related Application No. 201210083941.7.

(Continued)

*Primary Examiner* — Paulos M Natnael

(74) *Attorney, Agent, or Firm* — Sughrue Mion, PLLC

(57) ABSTRACT

A method of linkage-viewing a TV broadcasting program between a mobile communication apparatus and a digital TV, the method includes inputting a TV linkage-viewing command in order to successively view a TV broadcasting program which is being viewed on the mobile communication apparatus, on the digital TV; transmitting data information from the mobile communication apparatus to the digital TV according to the input of the TV linkage viewing command; and selecting a TV channel in the digital TV which is the same as a current channel which is being viewed on the mobile communication apparatus and chang- (Continued)

ing to the selected TV channel based on the data information which the digital TV has received.

38 Claims, 6 Drawing Sheets

Related U.S. Application Data continuation of application No. 11/875,262, filed on Oct. 19, 2007, now Pat. No. 8,233,090.

(58) Field of Classification Search
USPC ................................ 348/730, 731, 732, 552
See application file for complete search history.

(56) References Cited

U.S. PATENT DOCUMENTS

| | | | | | |
|---|---|---|---|---|---|
| 7,664,525 | B2 * | 2/2010 | Matsumoto | H04M 3/42 | 370/338 |
| 7,835,505 | B2 | 11/2010 | Toyama et al. | | |
| 8,219,083 | B2 * | 7/2012 | Rhim | H04N 7/17318 | 455/414.1 |
| 8,233,090 | B2 * | 7/2012 | Chun | H04H 60/80 | 348/552 |
| 8,316,410 | B2 * | 11/2012 | Sullivan | H04N 21/2223 | 725/133 |
| 8,364,125 | B2 * | 1/2013 | Erhart | H04L 29/06027 | 455/412.2 |
| 8,527,640 | B2 * | 9/2013 | Reisman | G06F 17/30873 | 709/227 |
| 8,588,758 | B2 * | 11/2013 | Ullrich | G06F 3/017 | 455/414.1 |
| 8,976,295 | B2 * | 3/2015 | Chun | H04H 60/80 | 348/552 |
| 9,171,221 | B2 * | 10/2015 | Lablans | H04N 5/23238 | |
| 2003/0040334 | A1 | 2/2003 | Lee | | |
| 2005/0262548 | A1 | 11/2005 | Shimojo et al. | | |
| 2007/0234225 | A1 * | 10/2007 | Aoki | G06F 17/30899 | 715/764 |
| 2008/0196072 | A1 * | 8/2008 | Chun | H04H 60/80 | 725/105 |
| 2009/0067846 | A1 * | 3/2009 | Yu | H04B 10/1143 | 398/128 |
| 2012/0236208 | A1 * | 9/2012 | Chun | H04H 60/80 | 348/730 |
| 2014/0317410 | A1 * | 10/2014 | Yamaguchi | H04L 63/08 | 713/171 |
| 2015/0281375 | A1 * | 10/2015 | Itasaki | G06F 17/30 | 709/219 |

FOREIGN PATENT DOCUMENTS

| | | | | |
|---|---|---|---|---|
| CN | 1805570 | A | | 7/2006 |
| CN | 1874473 | A | | 12/2006 |
| EP | 1 667 411 | A1 | | 6/2006 |
| JP | 2004048132 | A | | 2/2004 |
| JP | 2005-333371 | A | | 12/2005 |
| JP | 2006-005897 | A | | 1/2006 |
| JP | 2006041821 | A | * | 2/2006 |
| KR | 10-2003-0017181 | A | | 3/2003 |
| KR | 10-2005-0059717 | A | | 6/2005 |
| KR | 10-2006-0018480 | A | | 3/2006 |
| KR | 10-2006-0066312 | A | | 6/2006 |

OTHER PUBLICATIONS

Communication dated Jul. 2, 2015 issued by European Patent Office in counterpart European Patent Application No. 15159072.6.

Daisaku Komiya Xu Mingqiang Eunsoo Shim Panasonic, "Use Cases for Session Mobility in Multimedia Applications ; draft-komiya-mmusic-session-mobility-usecases-00.txt", IETF Standard-Working-Draft, Internet Engineering Task Force, IETF, CH, Feb. 27, 2006, XP015044303, ISSN: 0000-0004.

Communication dated Feb. 23, 2012, issued by the European Patent Office in counterpart European Application No. 08100717.1.

Communication dated Dec. 21, 2011, issued by the Korean Intellectual Property Office in counterpart Korean Application No. 10-2007-0015605.

Mate, S., et al., "Moveable-Multimedia: Session Mobility in Ubiquitous Computing Ecosystem", MUM 2006 International Conference on Mobile and Ubiquitous Multimedia, Dec. 4, 2006.

Extended European Search Report issued Jul. 4, 2011 in counterpart European Application No. 08100717.1.

Communication dated Aug. 3, 2011 from the State Intellectual Property Office of P.R. China in a counterpart application No. 200810005611.X.

Communication dated Aug. 26, 2013, issued by the European Patent Office in counterpart European Application No. 08 100 717.1.

Communication, dated Mar. 24, 2014, issued by the State Intellectual Property Office of the People's Republic of China in counterpart Chinese Application No. 201210083941.7.

Communication, Issued by the State Intellectual Property Office of P.R. China, Dated Sep. 10, 2014, In counterpart Chinese Application No. 201210083941.7.

Communication, Issued by the European Patent Office, Dated Jul. 30, 2014, In counterpart European Application No. 08 100 717.1.

Non-Final Office Action received in Parent U.S. Appl. No. 13/480,128, issued Nov. 6, 2013.

Final Office Action received in Parent U.S. Appl. No. 13/480,128, issued Apr. 25, 2014.

Notice of Allowance received in Parent U.S. Appl. No. 13/480,128, issued Aug. 7, 2014.

Notice of Allowance received in Parent U.S. Appl. No. 13/480,128, issued Oct. 27, 2014.

Communication, dated Oct. 26, 2015, issued by the State Intellectual Property Office of the People's Republic of China in counterpart Chinese Application No. 201210083941.7.

Communication dated Jun. 13, 2016, issued by the State Intellectual Property Office of P.R. China in counterpart Chinese application No. 201210083941.7.

Communication dated Nov. 11, 2016, issued by the European Patent Office in counterpart European Application No. 15159072.6.

Communication dated Nov. 14, 2016, issued by the European Patent Office in counterpart European Application No. 08100717.1.

* cited by examiner

METHOD OF LINKAGE-VIEWING TV BROADCASTING PROGRAM BETWEEN MOBILE COMMUNICATION APPARATUS AND DIGITAL TV, AND MOBILE COMMUNICATION APPARATUS AND DIGITAL TV THEREOF

CROSS-REFERENCE TO RELATED APPLICATIONS

This application is a continuation application of application Ser. No. 13/480,128 filed May 24, 2012, which is a continuation application of application Ser. No. 11/875,262, filed Oct. 19, 2007, which claims priority from Korean Patent Application No. 10-2007-0015605, filed on Feb. 14, 2007 in the Korean Intellectual Property Office, the disclosure of which is incorporated herein by reference.

BACKGROUND OF THE INVENTION

1. Field of the Invention

Apparatuses and methods consistent with the present invention relate to a mobile communication apparatus and a digital television (TV), and more particularly, to a method of linkage-viewing a TV broadcasting program between a mobile communication apparatus and a digital TV, and a mobile communication apparatus and a digital TV which enable a user to successively view a TV broadcasting program there between.

2. Description of the Related Art

Today, many people are using cellular phones, and can watch TV broadcasting programs through cellular phones due to technological development of cellular phones. Since it is possible to view TV broadcasting programs using cellular phones, people can watch TV broadcasting programs anytime, anywhere, with cellular phones enabling people to view TV broadcasting programs, for example, digital multimedia broadcasting (DMB) phones.

When a user moves to a place where a digital TV exists while he or she watches a TV broadcasting program on a DMB phone and wants to successively watch, on the digital TV, the TV broadcasting program which he or she is watching on the DMB phone, he or she must terminate, as illustrated in FIG. 1, watching on the DMB phone 110 at first and then operate the digital TV 120 manually, because a control means which can intercommunicate between the DMB phone 110 and the digital TV 120, or between the DMB phone 110 and a remote control unit 130 is not provided. That is, the user uses the remote control unit 130 or manually presses an electric power switch of the digital TV directly to turn on the digital TV if the digital TV 120 is in a status of power off. Then, the user operates a channel changeover switch (ordinarily manipulates a channel changeover switch provided in the remote control unit) to find a corresponding channel. Here, the user locates the remote control unit, and determines a corresponding channel to then manipulate the channel changeover switch. This procedure is inconvenient and time-consuming, particularly because there are a greater number of channels in a digital TV than an analog TV. Accordingly, a longer time is required for a user to successively watch the TV broadcasting program viewed on a cellular phone, on a digital TV. Therefore, the user may miss a part of the relevant program, or the TV broadcasting program may be ended to thus cause the user not to watch it any more.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Accordingly, it is an aspect of the present invention to provide a method of linkage viewing a TV broadcasting program between a mobile communication apparatus and a digital TV, in which a user can successively watch a TV broadcasting program which is being viewed on the mobile communication apparatus by linking the TV program to the digital TV without any special manipulation of the user.

It is another aspect of the present invention to provide a method of linkage viewing a TV broadcasting program between a mobile communication apparatus and a digital TV, in which a user can successively watch a TV broadcasting program which is being viewed on the digital TV by linking the TV broadcasting program to the mobile communication apparatus without any special manipulation of the user.

It is still another aspect of the present invention to provide a mobile communication apparatus which enables a user to successively watch a TV broadcasting program which is being viewed on the mobile communication apparatus by linking the TV broadcasting program to a digital TV without any special manipulation of the user.

It is yet another aspect of the present invention to provide a digital TV which enables a user to successively watch a TV broadcasting program which is being viewed on the digital TV by linking the TV broadcasting program to a mobile communication apparatus without any special manipulation of the user.

The foregoing and/or other aspects of the present invention are achieved by providing a method of linkage-viewing a TV broadcasting program between a mobile communication apparatus and a digital TV, the method including: inputting a TV linkage-viewing command in order to successively watch a TV broadcasting program which is being viewed on the mobile communication apparatus, on the digital TV; transmitting data information from the mobile communication apparatus to the digital TV according to the input of the TV linkage viewing command; and selecting a TV channel in the digital TV which is the same as a current channel which is being viewed on the mobile communication apparatus and changing to the selected TV channel based on the data information which the digital TV has received.

According to an aspect of the present invention, the inputting the TV linkage viewing command is achieved using a TV linkage-viewing button which is provided in the mobile communication apparatus.

According to an aspect of the present invention, the inputting the TV linkage-viewing command is achieved using a mobile communication apparatus linkage-viewing button which is provided in the digital TV.

According to an aspect of the present invention, the method of linkage-viewing a TV broadcasting program between a mobile communication apparatus and a digital TV further includes judging whether the digital TV is in a state of power on before the TV channel selecting and changing operation is performed, wherein if the digital TV is in power on state, the TV channel is selected and changed to the same channel as the current channel which is being viewed on the mobile communication apparatus, and if the digital TV is in power off state, the digital TV is made to be power on.

According to an aspect of the present invention, the data information includes program information and a signal which turns on/off power of the digital TV.

According to an aspect of the present invention, the program information includes at least one of broadcasting station information and a channel number.

The foregoing and/or other aspects of the present invention are achieved by providing a method of linkage-viewing a TV broadcasting program between a mobile communication apparatus and a digital TV, the method including: inputting a mobile communication apparatus linkage-viewing command in order to successively watch a TV broadcasting program which is being viewed on the digital TV, on the mobile communication apparatus; transmitting data information from the digital TV to the mobile communication apparatus according to the input of the mobile communication apparatus linkage-viewing command; and selecting a channel in the mobile communication apparatus which is the same as a current TV channel which is being viewed on the digital TV and changing to the selected channel based on the data information which the mobile communication apparatus has received.

According to an aspect of the present invention, the inputting the mobile communication apparatus linkage-viewing command is achieved using a mobile communication apparatus linkage-viewing button which is provided in the digital TV.

According to an aspect of the present invention, the inputting the mobile communication apparatus linkage-viewing command is achieved using a TV linkage-viewing button which is provided in the mobile communication apparatus.

According to an aspect of the present invention, the method of linkage-viewing a TV broadcasting program between a mobile communication apparatus and a digital TV further includes judging whether the mobile communication apparatus is executing a DMB program before the channel selecting and changing operation is performed, wherein if the mobile communication apparatus is executing the DMB program, the channel is selected and changed to the same channel as the current TV channel which is being viewed on the digital TV, and if the mobile communication apparatus is not executing the DMB program, the mobile communication apparatus is made to execute the DMB program.

According to an aspect of the present invention, the data information includes program information and a signal which causes the mobile communication apparatus to go into a TV broadcasting viewing mode.

According to an aspect of the present invention, the program information includes at least one of broadcasting station information and a channel number.

The foregoing and/or other aspects of the present invention are achieved by providing a mobile communication apparatus including: a display unit; an input unit which inputs a TV linkage-viewing command in order to successively watch a TV broadcasting program which is being viewed via the display unit on the mobile communication apparatus, on the digital TV, or a mobile communication apparatus linkage-viewing command in order to successively watch a TV broadcasting program which is being viewed on the digital TV, on the mobile communication apparatus; a transmission unit which transmits data information from the mobile communication apparatus to the digital TV according to the input of the TV linkage-viewing command or the mobile communication apparatus linkage-viewing command by the input unit; a reception unit which receives the data information from the digital TV according to the input of the mobile communication apparatus linkage-viewing command by the input unit; and a controller which controls the transmission unit to transmit the data information from the mobile communication apparatus to the digital TV, and controls the TV channel to be selected and changed to the same channel as a current TV channel which is being viewed on the digital TV, based on the data information which has been received through the reception unit.

According to an aspect of the present invention, the input unit includes an existing button provided in the mobile communication apparatus.

According to an aspect of the present invention, the input unit includes a separate unit independently from an existing button provided in the mobile communication apparatus.

The foregoing and/or other aspects of the present invention are achieved by providing a digital TV including: a digital TV main body having a display unit; an input unit which inputs a mobile communication apparatus linkage-viewing command in order to successively watch a TV broadcasting program which is being viewed via the display unit on the digital TV, on the mobile communication apparatus, or a TV linkage-viewing command in order to successively watch a TV broadcasting program which is being viewed on the mobile communication apparatus, on the digital TV; a communication unit which transmits and receives data information; and a controller which controls the communication unit to transmit and receive the data information according to the mobile communication apparatus linkage-viewing command or TV linkage-viewing command via the input unit, and controls to select and change a TV channel of the digital TV based on the data information which has been received through the communication unit.

According to an aspect of the present invention, the input unit is provided in the digital TV main body.

According to an aspect of the present invention, the digital TV further includes a remote control unit to wirelessly control the digital TV main body, wherein the input unit is provided in the remote control unit.

According to an aspect of the present invention, the input unit includes an existing button provided in the remote control unit.

According to an aspect of the present invention, the input unit includes a separate unit independently from an existing button provided in the remote control unit.

BRIEF DESCRIPTION OF THE DRAWINGS

The above and/or other aspects of the present invention will become apparent and more readily appreciated from the following description of the exemplary embodiments, taken in conjunction with the accompanying drawings in which.

DETAILED DESCRIPTION OF THE EXEMPLARY EMBODIMENTS

Figure 1:
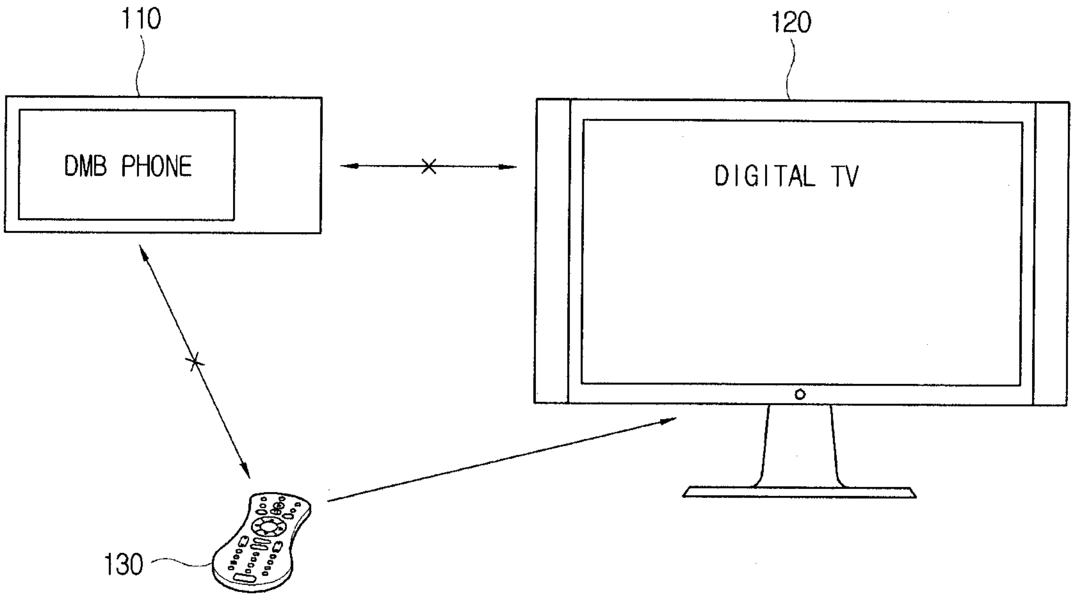
FIG. 1 (RELATED ART)
FIG. 1 is a diagram schematically illustrating a conventional communication-incapable state between a mobile communication apparatus and a digital TV.

Reference will now be made in detail to exemplary embodiments of the present invention, examples of which are illustrated in the accompanying drawings, wherein like reference numerals refer to like elements throughout. The exemplary embodiments are described below in order to explain the present invention by referring to the figures.

Figure 2:
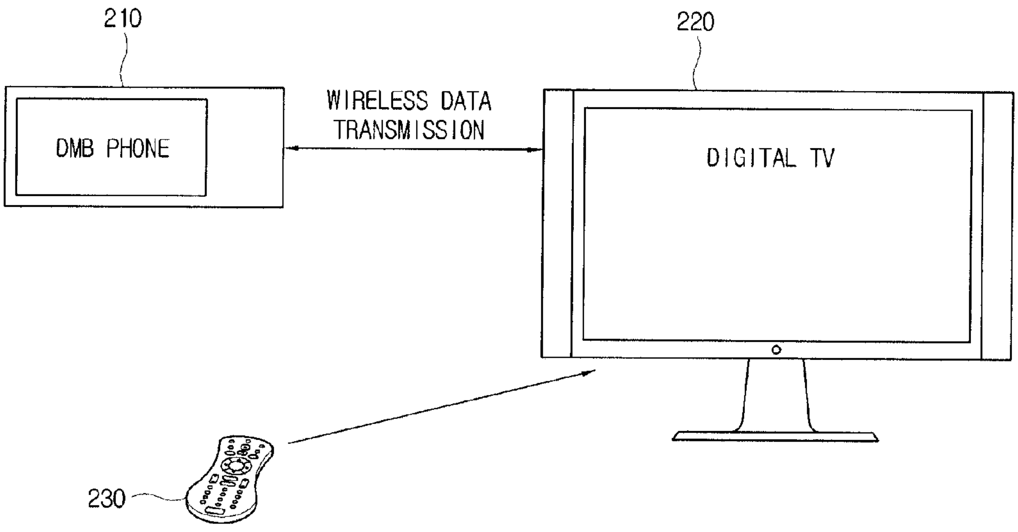
FIG. 2 is a diagram schematically illustrating a TV broadcasting program linkage-viewing mechanism between a mobile communication apparatus and a digital TV according to an exemplary embodiment of the present invention.
Figure 3A:
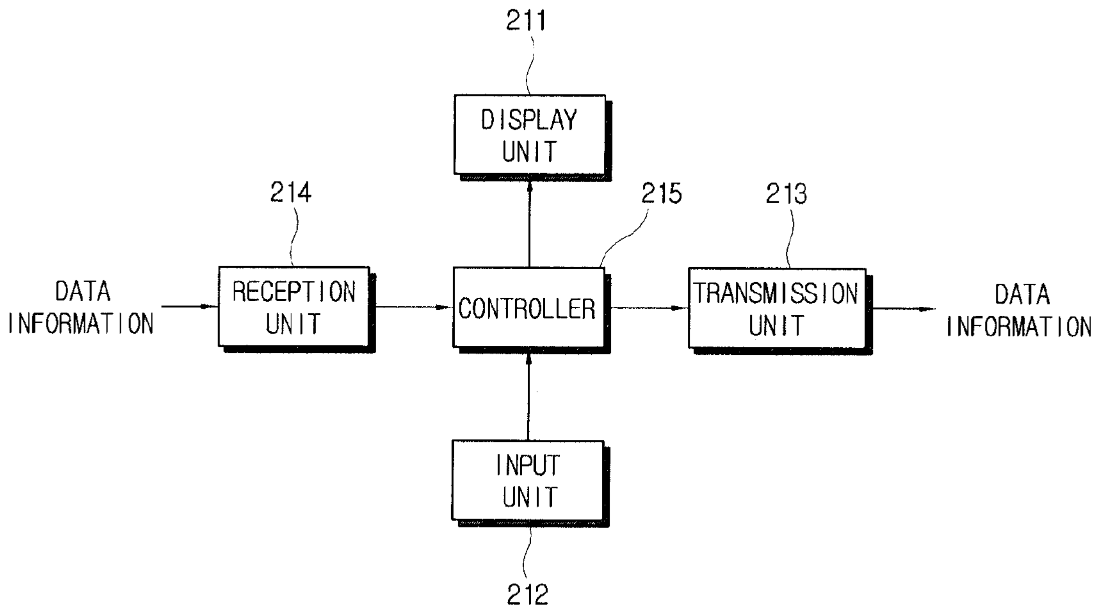
FIG. 3A is a block diagram schematically illustrating a configuration of a mobile communication apparatus according to an exemplary embodiment of the present invention.
Figure 3B:
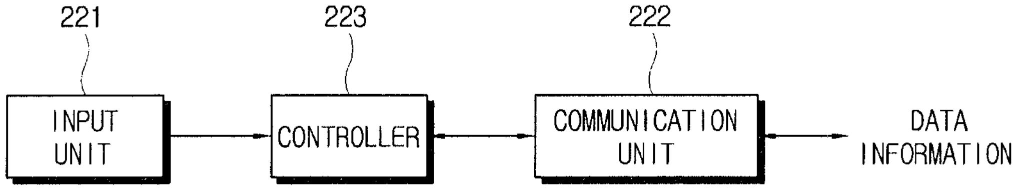
FIG. 3B is a block diagram schematically illustrating a configuration of a digital TV according to an exemplary embodiment of the present invention.

FIG. 2 is a diagram schematically illustrating a TV broadcasting program linkage-viewing mechanism between a mobile communication apparatus and a digital TV according to an exemplary embodiment of the present invention. FIG. 3A is a block diagram schematically illustrating a configuration of a mobile communication apparatus according to an exemplary embodiment of the present invention. FIG. 3B is a block diagram schematically illustrating a configuration of a digital TV according to an exemplary embodiment of the present invention.

Referring to FIGS. 2, 3A and 3B, a mobile communication apparatus (for example, a digital multimedia broadcasting (DMB) phone) 210 according to an exemplary embodiment of the present invention includes a display unit 211, an input unit 212, a transmission unit 213, and a reception unit 214 and a controller 215.

The display unit 211 displays figures, characters, or images thereon, as in a case of a general mobile communication apparatus.

A TV linkage-viewing command is input to the input unit 212 in order to successively watch a TV broadcasting program which is being viewed via the display unit 211 on the mobile communication apparatus 210, on a digital TV 220, or a mobile communication apparatus linkage-viewing command is input to the input unit 212 in order to successively watch a TV broadcasting program which is being viewed on the digital TV 220, on the mobile communication apparatus 210.

The input unit 212 may be implemented by at least one existing button provided in the mobile communication apparatus 210, or may be implemented by at least one separate unit independently from the existing button provided in the mobile communication apparatus 210.

That is, the input unit 212 may be embodied into any buttons among digit buttons and other functional buttons which are provided in the existing mobile communication apparatuses, or embodied into separate buttons independently from the existing units provided in the mobile communication apparatus 210.

The transmission unit 213 transmits data information from the mobile communication apparatus 210 to the digital TV 220 according to the input of the TV linkage-viewing command or the mobile communication apparatus linkage-viewing command by the input unit 212.

The reception unit 214 receives data information from the digital TV 220 according to the input of the mobile communication apparatus linkage-viewing command by the input unit 212.

The controller 215 controls the transmission unit 213 to transmit data information from the mobile communication apparatus 210 to the digital TV 220, and controls the mobile communication apparatus 210 to select and change a channel of the mobile communication apparatus 210 to the same channel as a current TV channel which is being viewed on the digital TV 220, based on the data information which has been received through the reception unit 214.

In addition, a digital TV 220 according to an exemplary embodiment of the present invention includes a TV main body, an input unit 221, a communication unit 222 and a controller 223. The digital TV 220 may further include a remote control unit 230 to wirelessly control the TV main body 220.

The TV main body 220 may include a display unit in an integrated form as in the case of a general digital TV.

A mobile communication apparatus linkage-viewing command is input to the input unit 221 in order to successively watch a TV broadcasting program which is being viewed on the digital TV 220, on the mobile communication apparatus 210 provided with a TV linkage-viewing button, or a TV linkage-viewing command is input to the input unit 221 in order to successively watch a TV broadcasting program which is being viewed on the mobile communication apparatus 210, on the digital TV 220.

Here, the input unit 221 may be provided in the digital TV main body, or may be provided in the remote control unit 230 to wirelessly control the digital TV main body.

In addition, the input unit 221 may be implemented by at least one existing button provided in the remote control unit 230, or may be implemented by at least one separate unit independently from the existing button provided in the remote control unit 230.

The controller 223 controls the communication unit 222 to transmit and receive the data information according to the mobile communication apparatus linkage-viewing command or TV linkage-viewing command via the input unit 221, and controls a TV channel of the digital TV to be selected and changed to the same channel as the currently viewed channel of the mobile communication apparatus 210, based on the data information which has been received through the communication unit 222.

A TV broadcasting program linkage-viewing method between a mobile communication apparatus and a digital TV will be described below in detail with reference to FIGS. 4 and 5, according to an exemplary embodiment of the present invention for the mobile communication apparatus and the digital TV having the above-described configuration.

Figure 4:
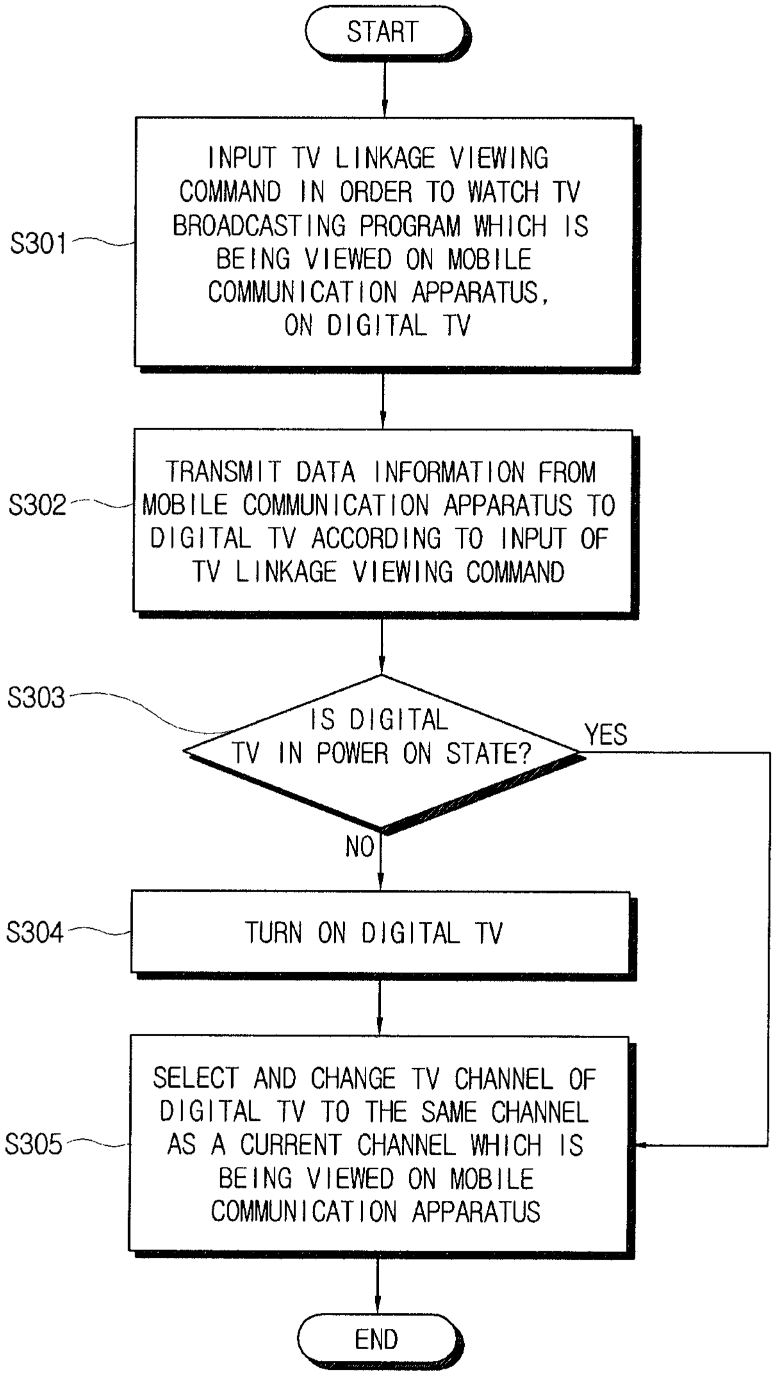
FIG. 4 is a flowchart illustrating an execution process of a TV broadcasting program linkage-viewing method between a mobile communication apparatus and a digital TV according to an exemplary embodiment of the present invention.

FIG. 4 is a flowchart illustrating an execution process of a TV broadcasting program linkage-viewing method between a mobile communication apparatus and a digital TV according to an exemplary embodiment of the present invention.

Referring to FIG. 4, a method of linkage watching a TV broadcasting program which is being viewed on a mobile communication apparatus 210 by linking the TV broadcasting program to a digital TV 220 will be described. In order to successively watch a TV broadcasting program which is being viewed on a mobile communication apparatus 210, on a digital TV 220, a user inputs a TV linkage-viewing command (S301). Here, the user uses a TV linkage-viewing button (not shown) provided in the mobile communication apparatus 210, for example, by pressing a button, or a mobile communication apparatus linkage-viewing button provided in the digital TV 220, to thus input the TV linkage-viewing command.

When the TV linkage-viewing command is input, the controller 215 of the mobile communication apparatus 210 transmits wireless data information from the mobile communication apparatus 210 to the digital TV 220 through a transmission unit 213 (S302). The data information may include program information and a signal which turns on/off electric power of the digital TV 220. In addition, the program information may include at least one of broadcasting station information and a channel number.

When wireless data information is transmitted from the mobile communication apparatus 210 to the digital TV 220, the controller 223 of the digital TV 220 judges whether or not the digital TV 220 is in a state of power on or off (S303). In this judgment, if electric power of the digital TV 220 is in the state of power on, the controller 223 selects and changes a TV channel of the digital TV to the same channel as a current channel which is being viewed on the mobile communication apparatus 210, based on data information which has been received (S305). If electric power of the digital TV 220 is in the state of power off in the judgment result of operation S303, the digital TV 220 is made to be turned on (S304). Then, the controller 223 selects and changes the TV channel to the same channel as the current channel which is being viewed on the mobile communication apparatus 210 as described above.

As described above, the user can successively watch a TV broadcasting program which is being viewed on the mobile communication apparatus 210, on a digital TV 220, by simply handling a TV linkage-viewing button which is provided in the mobile communication apparatus 210.

Figure 5:
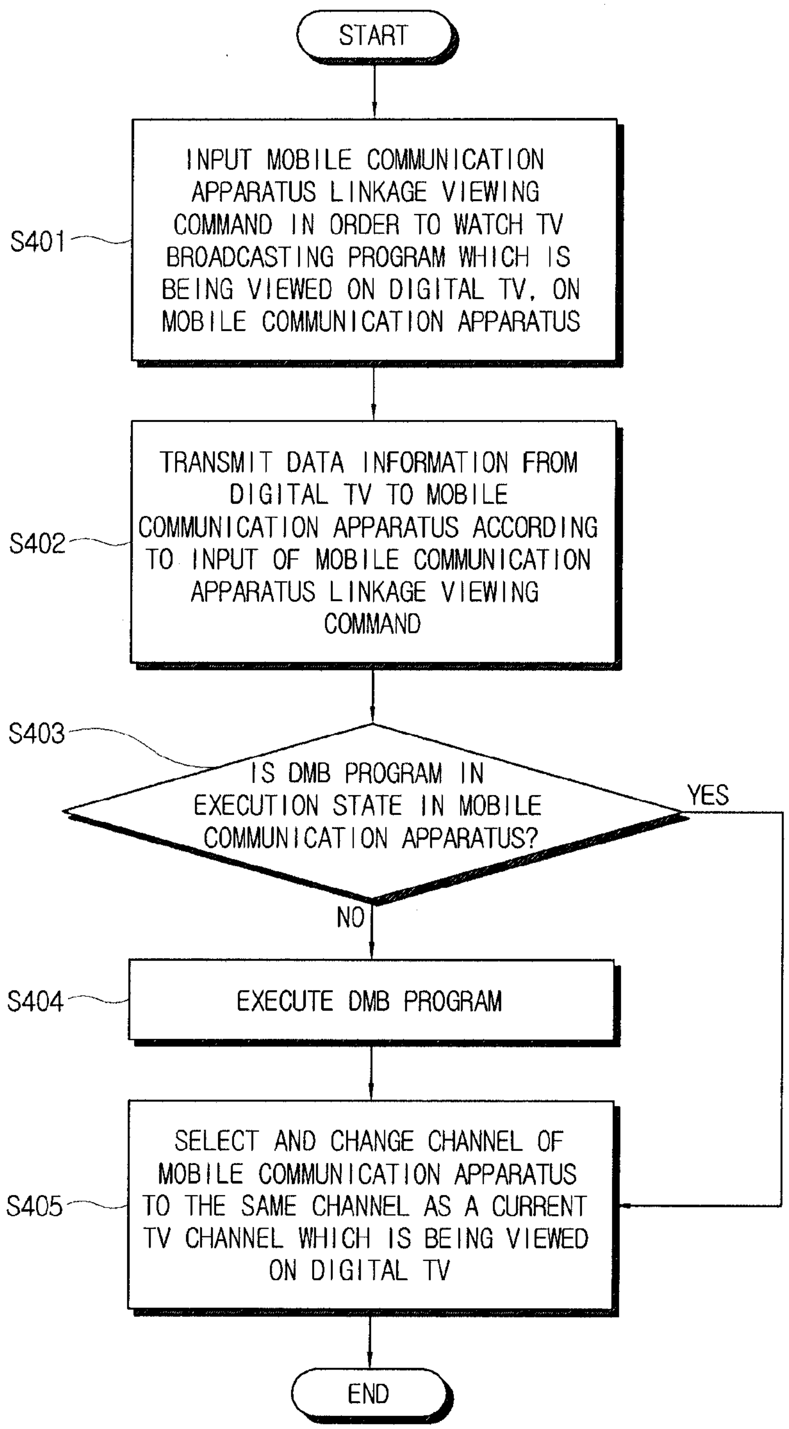
FIG. 5 is a flowchart illustrating an execution process of a TV broadcasting program linkage-viewing method between a mobile communication apparatus and a digital TV according to another exemplary embodiment of the present invention.

FIG. 5 is a flowchart illustrating an execution process of a TV broadcasting program linkage-viewing method between a mobile communication apparatus and a digital TV according to another exemplary embodiment of the present invention.

Referring to FIG. 5, a method of linkage watching a TV broadcasting program which is being viewed on a digital TV 220 by linking the TV broadcasting program to a mobile communication apparatus 210 will be described. In order to successively watch a TV broadcasting program which is being viewed on a digital TV 220, on a mobile communication apparatus 210, a user inputs a mobile communication apparatus linkage-viewing command (S401). Here, the user uses a mobile communication apparatus linkage-viewing button (not shown) provided in the digital TV 220, for example, the TV main body or a remote control unit, or a TV linkage-viewing button provided in the mobile communication apparatus 210, to thus input the mobile communication apparatus linkage-viewing command.

Thus, when the mobile communication apparatus linkage-viewing command is input, the controller 223 of the digital TV 220 transmits data information, that is, wireless data information, from the digital TV 220 to the mobile communication apparatus 210 through a communication unit 222 (S402). The data information may include program information and a signal which makes the mobile communication apparatus go into the TV broadcasting viewing mode. In addition, the program information may include at least one of broadcasting station information and a channel number.

As described above, when wireless data information is transmitted from the digital TV 220 to the mobile communication apparatus 210, the controller 215 of the mobile communication apparatus 210 judges whether or not the mobile communication apparatus 210 executes a DMB program (S403). In this judgment, if the DMB program has been executed, the controller 215 selects and changes a channel of the mobile communication apparatus to the same channel as a current TV channel which is being viewed on the digital TV 220, based on data information which has been received (S405). If the DMB program has not been yet executed in the mobile communication apparatus 210 in the judgment result of operation S403, the DMB program is made to be executed (S404). Then, the controller 215 selects and changes the channel to the same channel as the current TV channel which is being viewed on the digital TV 220 as described above.

As described above, the user can watch a TV broadcasting program which is being viewed on the digital TV 220, on the mobile communication apparatus 210, by simply handling a mobile communication apparatus linkage-viewing button which is provided in the digital TV 220.

As described above, the present invention provides a method of linkage viewing a TV broadcasting program between a mobile communication apparatus and a digital TV, in which a user can successively watch a TV broadcasting program which is being viewed on the mobile communication apparatus, on the digital TV, or successively watch a TV broadcasting program which is being viewed on the digital TV, on the mobile communication apparatus, by simply handling a TV linkage-viewing button provided in the mobile communication apparatus, or a mobile communication apparatus linkage-viewing button provided in the digital TV.

Although a few exemplary embodiments of the present invention have been shown and described, the present invention is not limited thereto, but it will be appreciated by those skilled in the art that various modifications may be made in these exemplary embodiments without departing from the principles and spirit of the invention, the scope of which is defined in the appended claims and their equivalents.

What is claimed is:

1. A display apparatus comprising:

a display unit;

a communication unit configured to communicate with a first external device; and a control unit configured to, in response to receiving a command for linkage-view to display successively a content which is being displayed in the first external device via the communication unit from the first external device, determine whether a predefined computer program for the linkage-view is executed, if the predefined computer program is not executed, to execute the predefined computer program, to receive information on the content directly from the first external device, and to control the display unit to display a corresponding content through the executed predefined computer program using the information on the content received from the first external device, the corresponding content being received from a second external device, wherein the information on the content comprises at least one of information related to the second external device and channel information of the content.

2. The display apparatus according to claim 1, wherein the second external device comprises a broadcasting station.

3. The display apparatus according to claim 1, wherein the information on the content is received with the command for linkage-view from the first external device.

4. The display apparatus according to claim 1, wherein the first external device and the second external device are independent of each other.

5. The display apparatus according to claim 1, wherein the predefined computer program includes a computer program executed when the display apparatus operates in a broadcasting viewing mode.

6. The display apparatus according to claim 5, wherein the predefined computer program includes a digital multimedia broadcasting (DMB) program.

7. The display apparatus according to claim 1, wherein the information on the content comprises a signal to change a mode of the display apparatus.

8. The display apparatus according to claim 7, wherein the mode to be changed is a broadcasting viewing mode.

9. The display apparatus according to claim 1, further comprising an input unit configured to receive the command for linkage-view.

10. The display apparatus according to claim 1, wherein the control unit transmits a signal to the first external device to turn on power of first external device if the first external device is in a state of power off.

11. A method of controlling a display apparatus, the method comprising:

communicating with a first external device;

in response to receiving a command for linkage-view to display successively a content which is being displayed in the first external device from the first external device, determining whether a predefined computer program for the linkage-view is executed;

if the predefined computer program is not executed, executing the predefined computer program;

receiving information on the content directly from the first external device; and displaying a corresponding content through the executed predefined computer program using the information on the content received from the first external device, the corresponding content being received from a second external device, wherein the information on the content comprises at least one of information related to the second external device and channel information of the content.

12. The method according to claim 11, wherein the second external device comprises a broadcasting station.

13. The method according to claim 11, wherein the information on the content is received with the command for linkage-view from the first external device.

14. The method according to claim 11, wherein the first external device and the second external device are independent of each other.

15. The method according to claim 11, wherein the predefined computer program includes a computer program executed when the display apparatus operates in a broadcasting viewing mode.

16. The method according to claim 15, wherein the predefined computer program includes a DMB program.

17. The method according to claim 11, wherein the information on the content comprises a signal to change a mode of the display apparatus.

18. The method according to claim 17, wherein the mode to be changed is a broadcasting viewing mode.

19. The method according to claim 11, further comprising transmitting a signal to the first external device to turn on power of first external device if the first external device is in a state of power off.

20. A display apparatus comprising:

a display unit;

a communication unit; and a control unit configured to, in response to selecting a button for linkage view, control the communication unit to transmit information on a content which is being displayed on the display unit directly to the first external device such that the information is usable by the first external device to display a corresponding content successively on the first external device, the corresponding content being received from a second external device, wherein the information on the content comprises at least one of information related to the second external device and channel information of the content.

21. The display apparatus according to claim 20, wherein the button for linkage view is provided if the display apparatus is placed where the first external device is located while the display apparatus displays the content on the display unit.

22. The display apparatus according to claim 20, wherein in response to selecting the button for linkage view, the control unit transmits a command for linkage view with the information on the content to the first external device, and wherein in response to receiving, by the first external device, the command for linkage view, the first external device executes a predefined program for reproducing a corresponding content if the predefined program is not executed.

23. The display apparatus according to claim 20, wherein the button for linkage view comprises an input button which is a separate unit independent from an existing button in the display apparatus.

24. The display apparatus according to claim 20, wherein the button for linkage view comprises an input button which is an existing button in the display apparatus.

25. The display apparatus according to claim 20, wherein in response to selecting the button for linkage view while the content is reproduced through a predefined program, the control unit stops reproducing of the content.

26. The display apparatus according to claim 20, wherein the control unit transmits a command for linkage view to display successively a TV broadcasting program which is being displayed on the display apparatus to the first external device so that the TV broadcasting program is displayed in the first external device without an additional manipulation.

27. The display apparatus according to claim 20, wherein the first external device comprises a digital TV.

28. The display apparatus according to claim 20, wherein the second external device comprises a broadcasting station.

29. The display apparatus according to claim 20, wherein the first external device and the second external device are independent of each other.

30. The display apparatus according to claim 20, wherein the content is selected by selecting a TV channel.

31. The display apparatus according to claim 20, wherein the control unit transmits a signal to the first external device to turn on power of first external device if the first external device is in a state of power off.

32. A display apparatus comprising:

a display unit;

a communication unit configured to communicate with a first external device; and a control unit configured, in response to receiving a linkage-view command for displaying successively a content which is being displayed in the first external device via the communication unit directly from the first external device, to execute a predefined computer program for displaying the content successively if the predefined computer program is not executed and to control the display unit to display a corresponding content through the executed predefined computer program using information on the content received from the first external device, the corresponding content being received from a second external device, wherein the information on the content comprises at least one of information related to the second external device and channel information of the content.

33. The display apparatus according to claim 32, wherein the second external device comprises a broadcasting station.

34. The display apparatus according to claim 32, wherein the information on the content is received with the linkage-view command from the first external device.

35. The display apparatus according to claim 32, wherein the first external device and the second external device are independent of each other.

36. The display apparatus according to claim 32, wherein the predefined computer program includes a computer program executed when the display apparatus operates in a broadcasting viewing mode.

37. The display apparatus according to claim 32, wherein the predefined computer program includes a digital multimedia broadcasting (DMB) program.

38. The display apparatus according to claim 32, further comprising an input unit configured to receive the linkage-view command.

* * * * *